(12) United States Patent
Poissant (10) Patent No.: US 11,517,837 B2
(45) Date of Patent: Dec. 6, 2022

(54) FILTER AND FILTERING ASSEMBLY

(71) Applicant: PAD PERIPHERAL ADVANCED DESIGN INC., Saint-Bruno-de-Montarville (CA)

(72) Inventor: Daniel Poissant, Mont St-Hilaire (CA)

(73) Assignee: PAD PERIPHERAL ADVANCED DESIGN INC.

(*) Notice: Subject to any disclaimer, the term of this patent is extended or adjusted under 35 U.S.C. 154(b) by 204 days.

(21) Appl. No.: 16/865,275

(22) Filed: May 1, 2020

(65) Prior Publication Data

US 2020/0346145 A1    Nov. 5, 2020

Related U.S. Application Data

(60) Provisional application No. 62/842,589, filed on May 3, 2019.

(51) Int. Cl.
| | |
|---|---|
| *B01D 35/30* | (2006.01) |
| *B01D 29/23* | (2006.01) |
| *B01D 35/06* | (2006.01) |
| *B41J 2/175* | (2006.01) |

(52) U.S. Cl.
CPC .......... *B01D 35/306* (2013.01); *B01D 29/23* (2013.01); *B01D 35/06* (2013.01); *B01D 2201/304* (2013.01); *B01D 2201/306* (2013.01); *B41J 2/17563* (2013.01)

(58) Field of Classification Search
CPC ...... B01D 35/306; B01D 29/23; B01D 35/06; B01D 2201/304; B01D 2201/306; B01D 2201/347; B01D 29/96; B01D 35/30; B01D 29/35; B41J 2/17563
See application file for complete search history.

(56) References Cited

FOREIGN PATENT DOCUMENTS

| | | | |
|---|---|---|---|
| CA | 2421132 A1 | | 9/2004 |
| CN | 105561669 A | * | 5/2016 |
| WO | 2004101106 A1 | | 11/2004 |
| WO | WO-2004101106 A1 | * | 11/2004 ............. B01D 35/06 |

* cited by examiner

*Primary Examiner* — Waqaas Ali
(74) *Attorney, Agent, or Firm* — Lavery, De Billy, LLP; Gwendoline Bruneau (57) ABSTRACT

A filter assembly, comprising an open top housing comprising an inlet and an outlet; a filtering unit configured to be positioned within the housing, the filtering unit comprising a filter; a mounting arm connected to the d housing; and a fastener actuatable for extension from the mounting arm; wherein:
  iv) in a first position, the mounting arm is moved away from the open top of the housing;
  v) in a second position, the filtering unit is positioned within the housing, the mounting arm is positioned on top of the housing, and the mounting arm secures the filter within the housing;
  vi) in a third position, the filter is being positioned within the housing, the mounting arm is positioned on top of the housing and connected to the housing in fluid tightness, the mounting arm secures the filter in fluid tightness within the housing; and the inlet and the outlet of the housing are opened to a flow of fluid to be filtered through the filter.

18 Claims, 8 Drawing Sheets

FIG_9

FILTER AND FILTERING ASSEMBLY

CROSS REFERENCE TO RELATED APPLICATIONS

This application claims benefit of U.S. provisional application Ser. No. 62/842,589, filed May 3, 2019. All documents above are incorporated herein in their entirety by reference.

FIELD OF THE INVENTION

The present invention relates to filters. More specifically, the present disclosure is concerned with filters for the printing industry.

BACKGROUND OF THE INVENTION

In the printing industry, liquids such as inks are filtered before use to remove particles that may interfere with the printing process. Indeed, particles may result in poor quality prints or even damage printing equipment.

Conventionally, the printing industry uses bulky filters that are difficult to open and to clean.

There is still a need in the art for a filter.

The present description refers to a number of documents, the content of which is herein incorporated by reference in their entirety.

SUMMARY OF THE INVENTION

More specifically, in accordance with the present disclosure, there is provided a filter assembly, comprising an open top housing comprising an inlet and an outlet; a filtering unit configured to be positioned within the housing, the filtering unit comprising a filter; a mounting arm connected to the d housing; and a fastener actuatable for extension from the mounting arm; wherein: in a first position, the mounting arm is moved away from the open top of the housing; in a second position, the filtering unit is positioned within the housing, the mounting arm is positioned on top of the housing, and the mounting arm secures the filter within the housing; in a third position, the filter is being positioned within the housing, the mounting arm is positioned on top of the housing and connected to the housing in fluid tightness, the mounting arm secures the filter in fluid tightness within the housing; and the inlet and the outlet of the housing are opened to a flow of fluid to be filtered through the filter.

There is further provided a sealing combination for a filter assembly comprising a filter within a housing, said combination comprising a mounting arm and a fastener actuatable for extension from said mounting arm wherein the mounting arm is moved away from an open top of the housing in a first position; and in said first position, said filter is positioned within the housing; once the filter is positioned within the housing, the mounting arm is positioned over the open top of the housing and connected to said housing in fluid tightness.

Other objects, advantages and features of the present disclosure will become more apparent upon reading of the following non-restrictive description of specific embodiments thereof, given by way of example only with reference to the accompanying drawings.

DESCRIPTION OF ILLUSTRATIVE EMBODIMENTS

The present disclosure is illustrated in further details by the following non-limiting examples.

Turning to the appended figures, a filter assembly according to an illustrative embodiment of the present disclosure will be described.

The filter assembly 10 generally comprises a housing 12, a filtering unit 14 and a mounting arm 16.

Figure 1A:
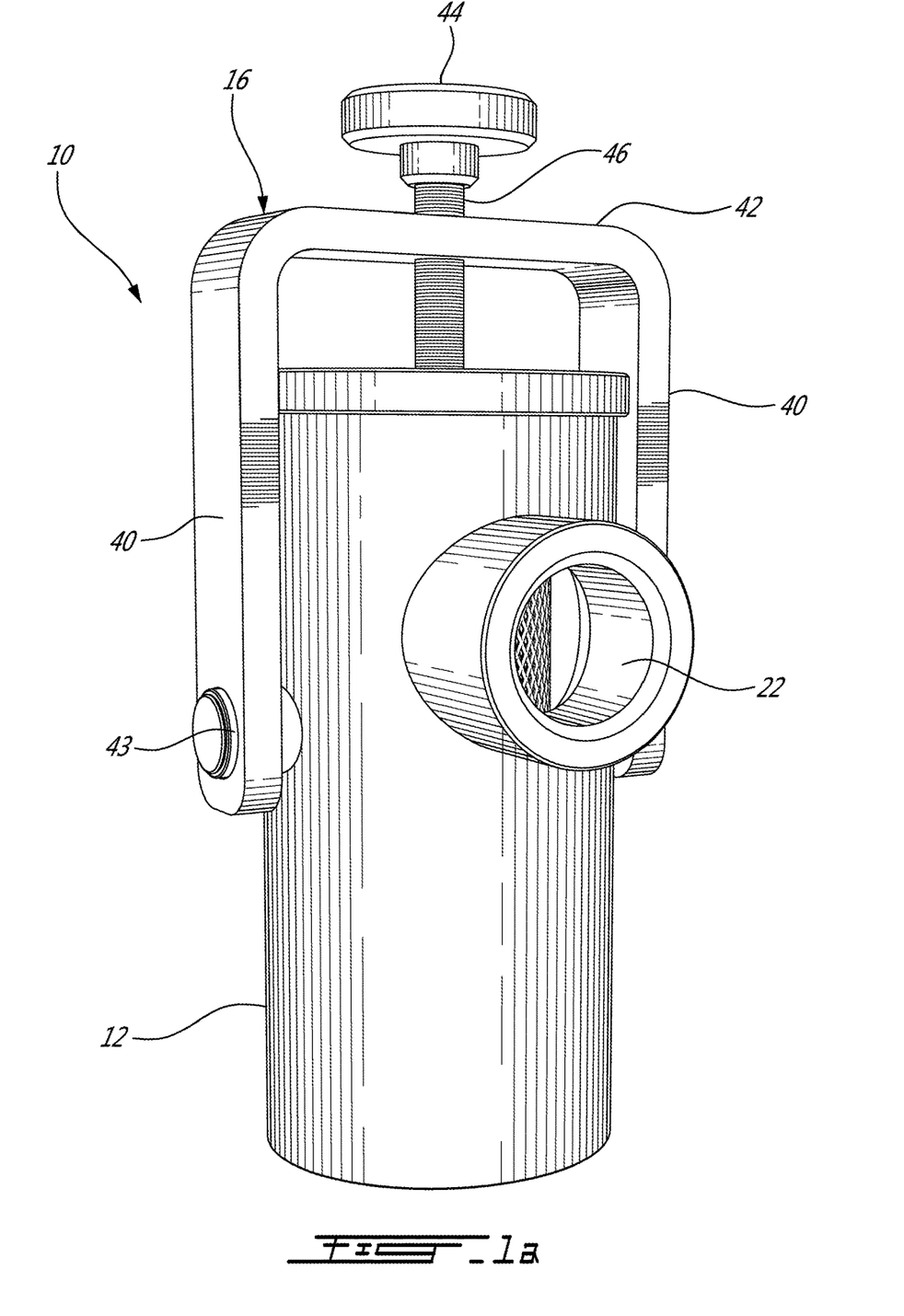
FIG. 1A is a perspective front view of a filter assembly according to an embodiment of an aspect of the present disclosure.
Figure 2:
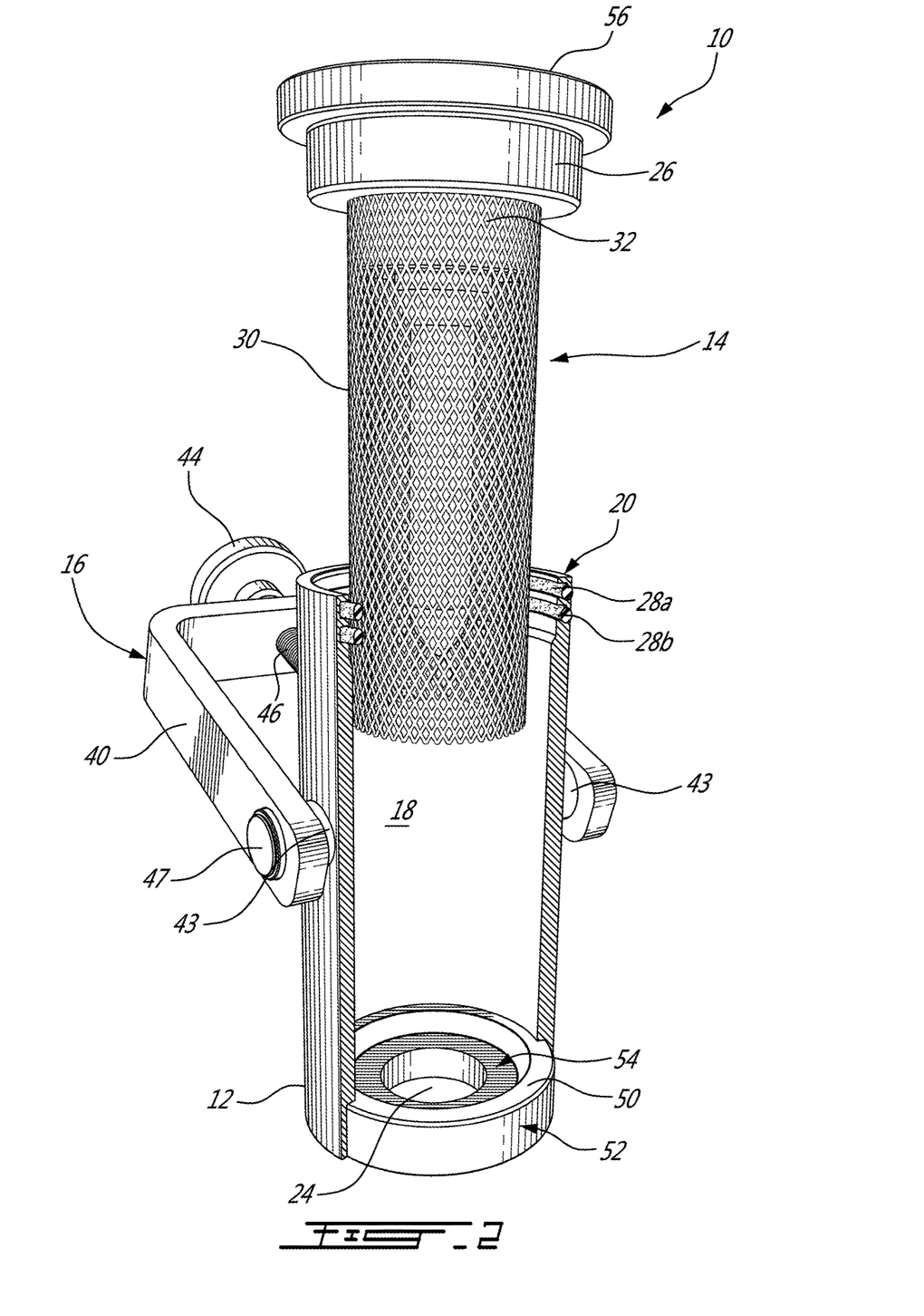
FIG. 2 shows the inside of a filter assembly according to an embodiment of an aspect of the present disclosure.

The housing 12 is shown as an open top tubular body (see top end 20 in FIG. 2), provided with an inlet 24, shown in FIG. 2 at a closed bottom end 52 thereof, and an outlet 22, shown in FIG. 1 on the lateral wall thereof.

Figure 7:
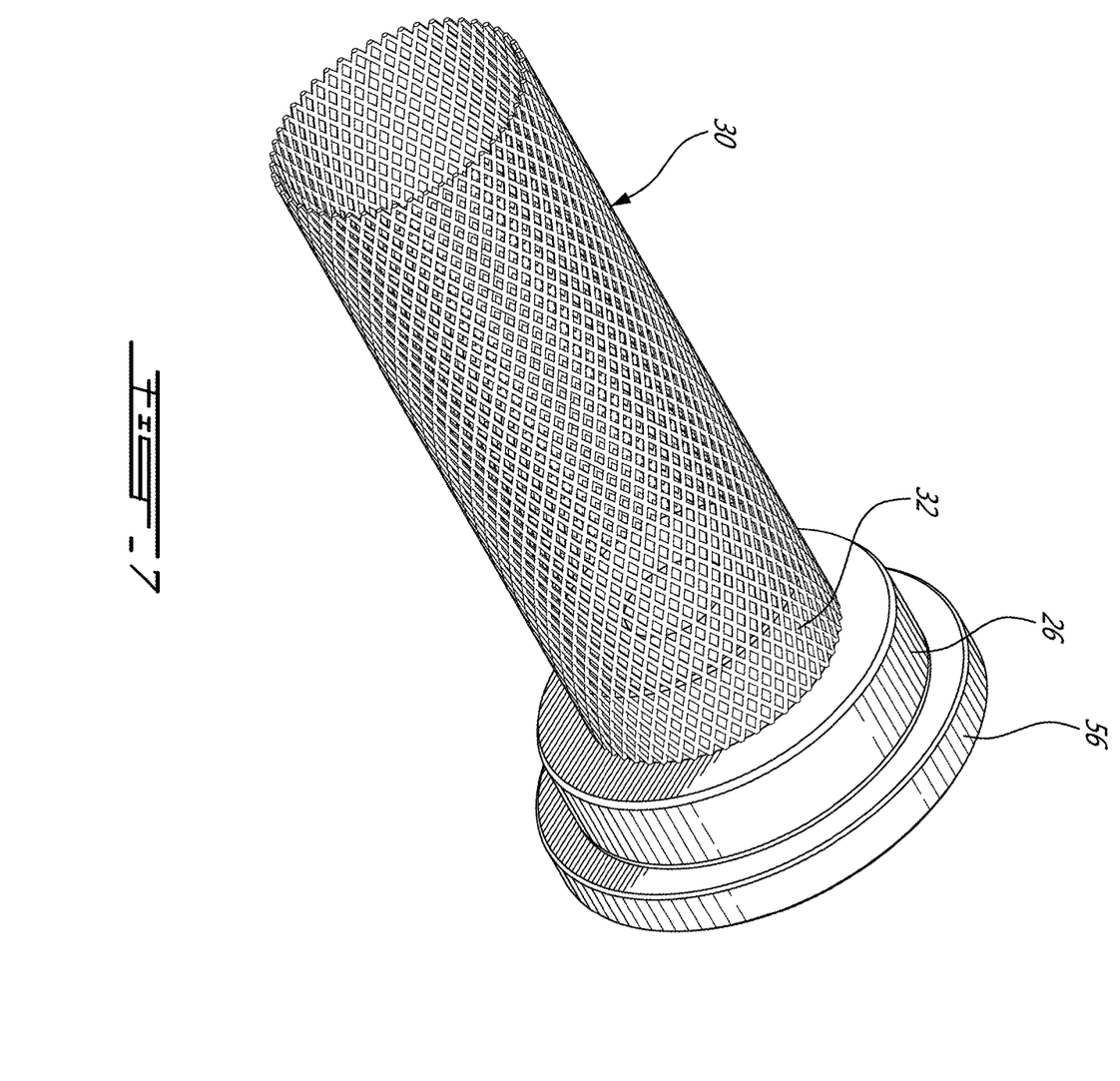
FIG. 7 is a perspective view of a filtering unit of a filter assembly according to an embodiment of an aspect of the present disclosure.

As illustrated in FIG. 7, the filtering unit 14 comprises a cap 26 and a filter 30. As illustrated in FIG. 2, the filter 30 comprises a cylindrical screen mounted to a downward projection 32 of the cap 26.

Figure 5:
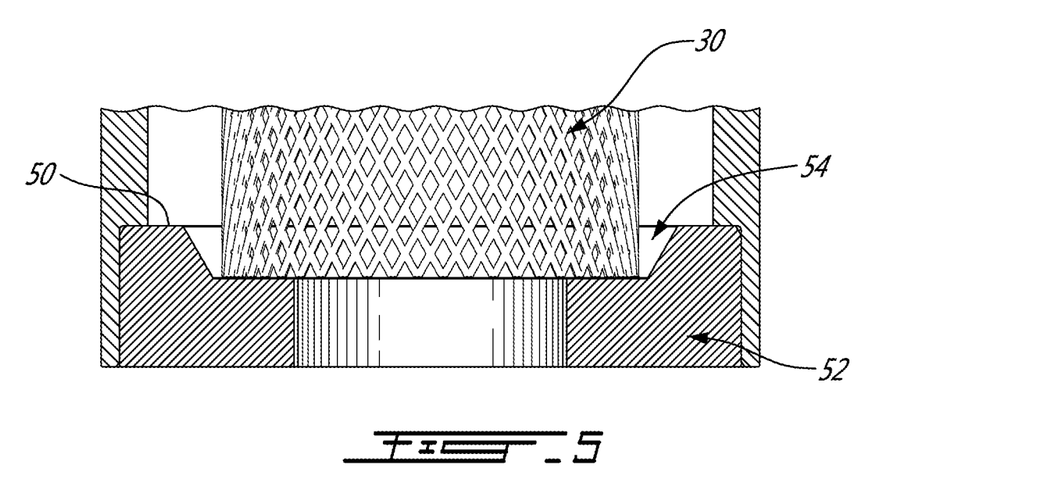
FIG. 5 is a close up view of the body of a filter assembly according to an embodiment of an aspect of the present disclosure.

The cylindrical screen of the mechanical filter 30 is mounted by its top edge to the cap 26 for a vertical alignment relative to the cap 26, by slide fit about the projection 32 of the cap 26 as shown for example in FIG. 7, or by spot welding to the projection 32 of the cap 26 (not shown) for example. At the opposite end, the inner surface 50 of the bottom end 52 of the tubular housing 12 receives the bottom edge of the screen 30. The length of the screen from the cap 26 may be selected so that the bottom edge of the screen seats on the bottom inner surface of the tubular body opposite the open-top of the tubular body when the filter assembly is positioned within the tubular body. The inner surface 50 of the bottom end 52 of the tubular housing 12 may comprise a receiving seat, such as a circumferential recess 54 for example (see FIGS. 2 and 5 for example), of a conical or ellipsoidal shape as best seen in FIG. 5 for example, for ensuring alignment of the screen 30 within the tubular housing 12.

The mounting arm 16 as illustrated herein comprises side arms 40 connected together by a linking arm 42 and pivotally connected to the tubular housing 12 by pivots 43 for example. A fastener 44 comprising a threaded rod 46 extending from a knob 44 is mounted through a threaded aperture 55 of the mounting arm 16 (see FIG. 8 for example).

Figure 1B:
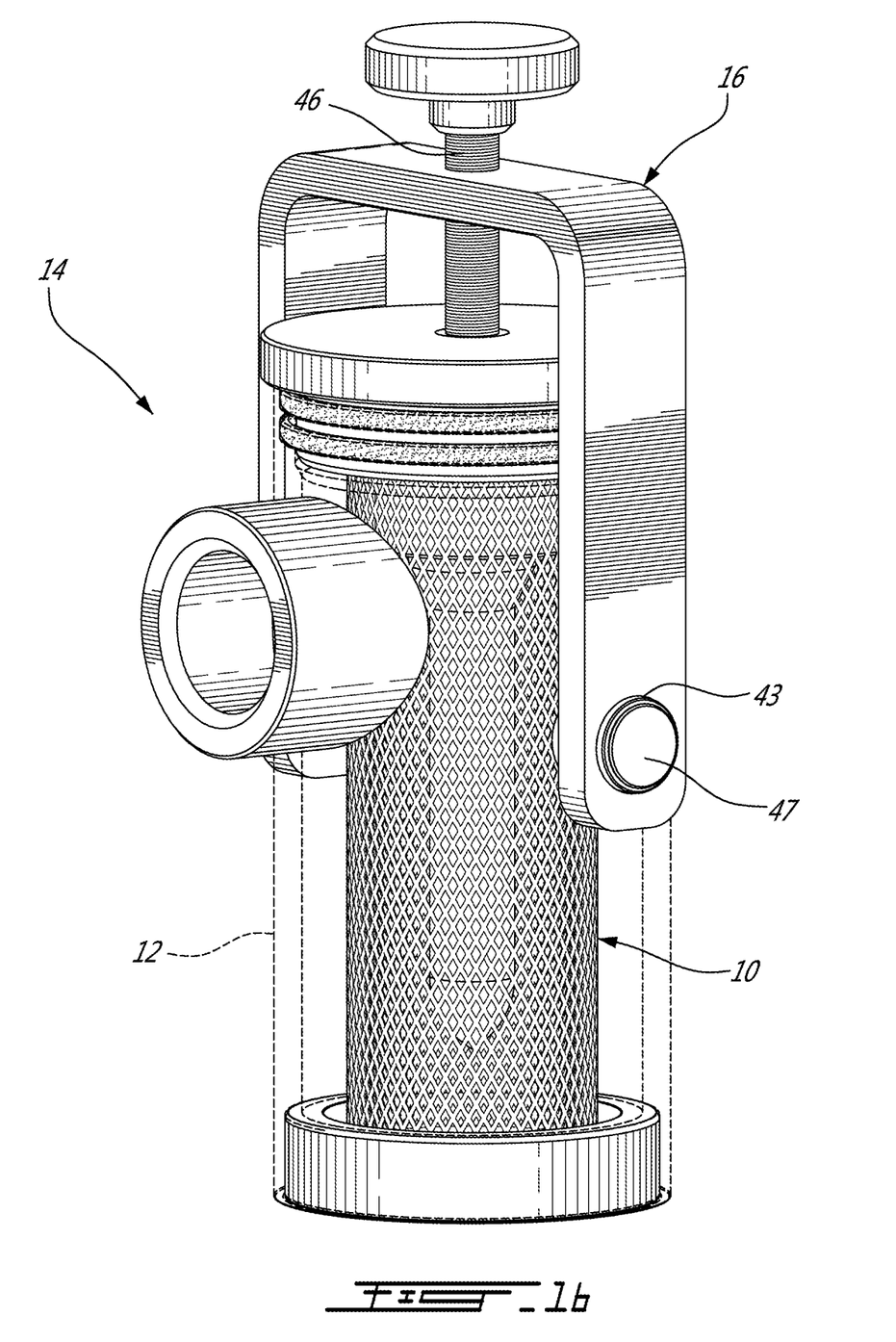
FIG. 1B shows a filter assembly according to an embodiment of an aspect of the present disclosure in transparency.
Figure 4:
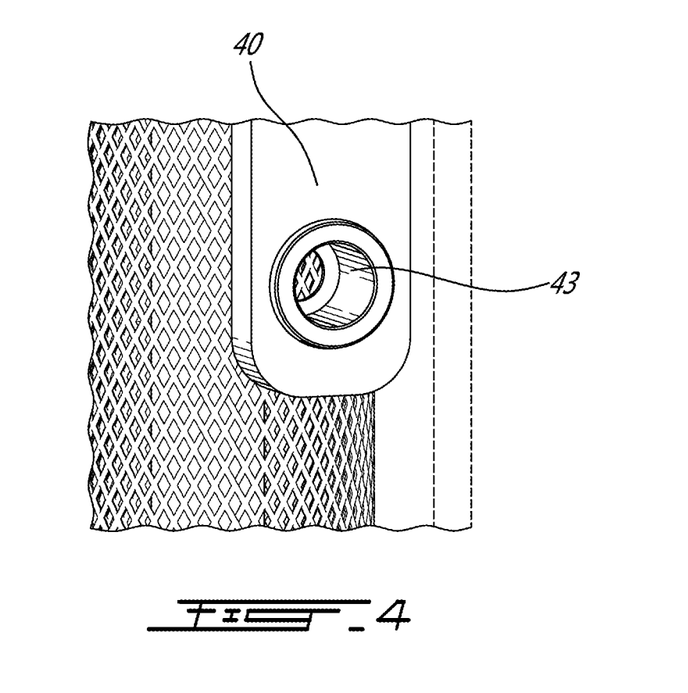
FIG. 4 is a close up view of the body of a filter assembly according to an embodiment of an aspect of the present disclosure.
Figure 9:
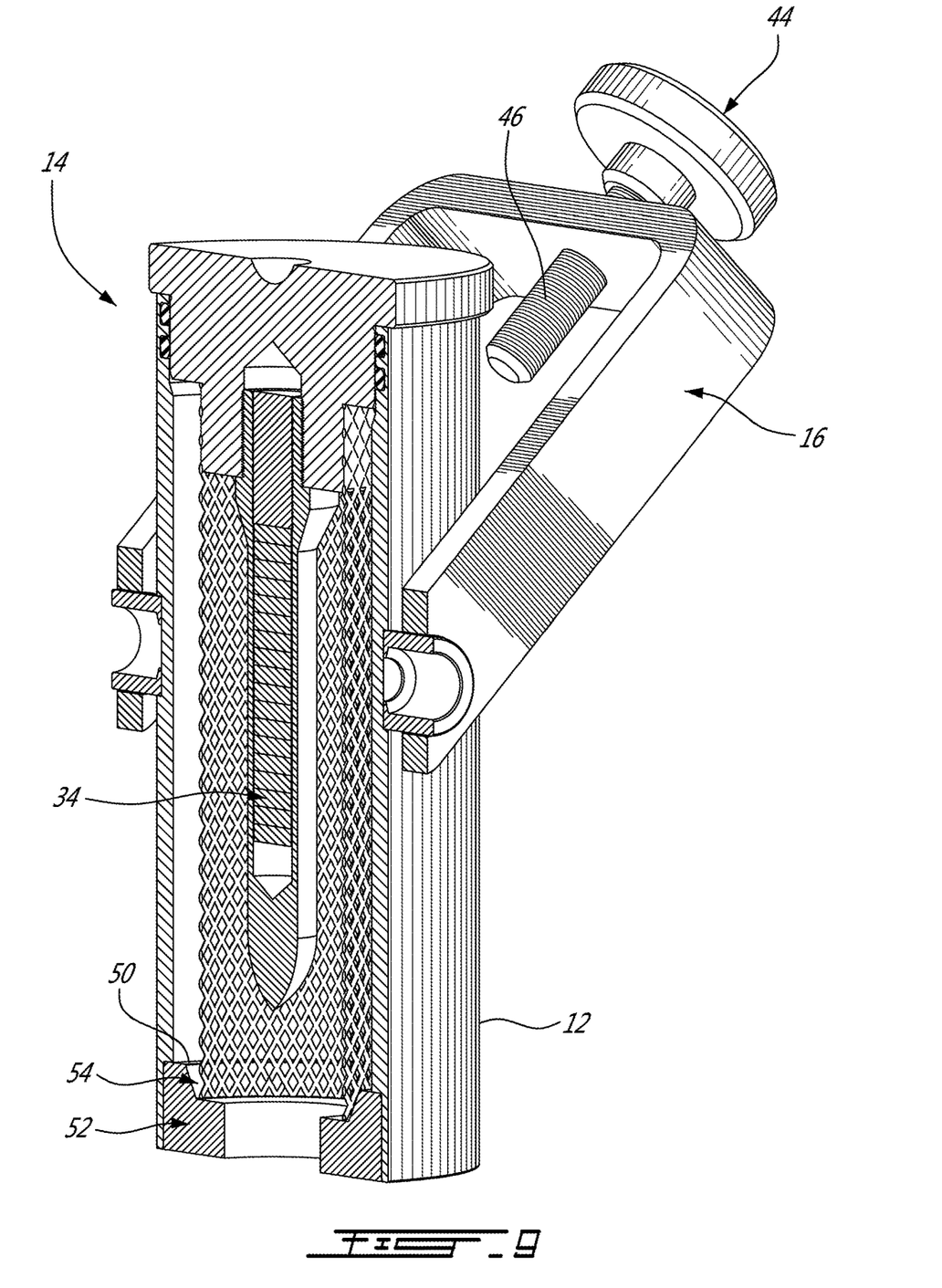
FIG. 9 is a top cross-sectional view of a filter assembly according to an embodiment of an aspect of the present disclosure.

In an opened position shown in FIG. 9, with the mounting arm 16 moved away from the top of the tubular housing 12, the filtering unit 14 may be positioned within the tubular housing 12. Then the mounting arm 16 is moved on top of the tubular housing 12. As shown in FIG. 4, the side arms 40 are fixedly connected to the tubular housing 12, by welding the inside of the pivots 43 for example, once the filtering unit 14 is aligned within the tubular housing 12 as described herein, into a closed position in which the mounting arm 16 secures the filtering unit 14 within the tubular housing 12 as illustrated in FIG. 1B, in liquid tightness of the inside of the tubular housing 12, the rod applying pressure as controlled by actuation of the knob, the pivots 43 not in fluid communication with the inside of the tubular housing 12 (see FIG. 2). A cap 47 may be provided to cover pivots 43 of a pivoting mounting arm 16 as shown in FIGS. 1B, 2 for design purposes for example.

Figure 3:
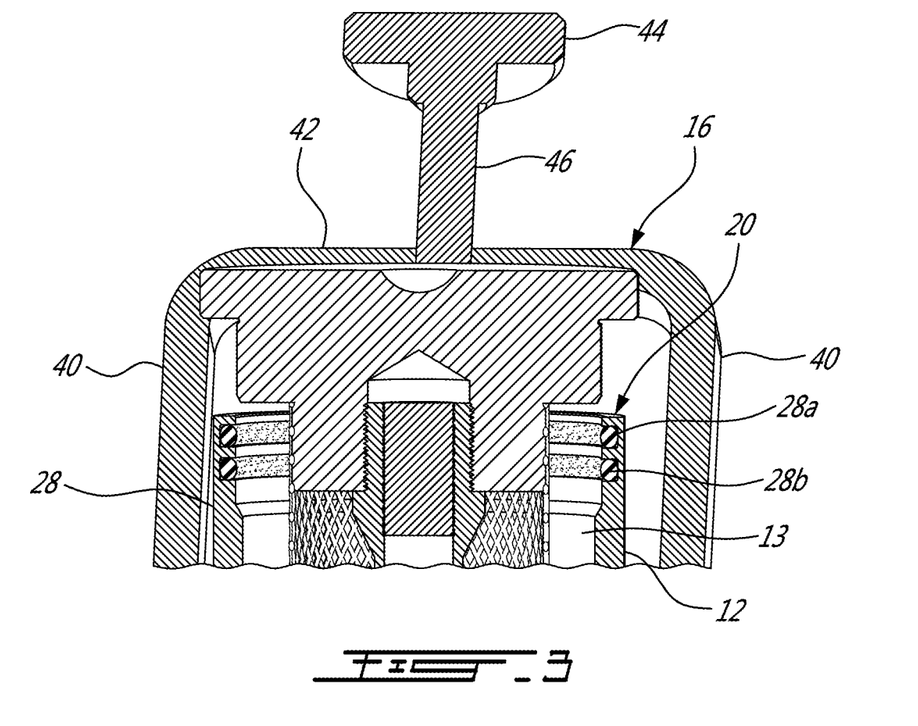
FIG. 3 is a close up view of the body of a filter assembly according to an embodiment of an aspect of the present disclosure.

FIG. 3 further shows a seal 28, formed of Teflon™ O-rings 28a and 28b for example, mounted on the inner surface of the lateral wall of the tubular housing 12. The seal 28 is mounted below the top end 20, so that when the filtering unit 14 is in place within the tubular housing 12 as will be described hereinbelow, the seal 28 is positioned between the cap 26 of the filtering unit 14 and the inner surface of the lateral wall of the tubular housing 12. The seal 28 is selected for leak tightness even under low compression while allowing easy removal and reinstallation of the cap assembly 26. The seal 28 is selected for chemical compatibility with fluids processed within the filter assembly 10 and for wear resistance.

Once positioned within the tubular housing 12 as shown in FIG. 9 for example, the filtering unit 14 is removable from the tubular housing 12 by pulling on the cap 26 to pull the filtering unit 14 out through the top opening 20 of the tubular housing 12. Once thus removed from the tubular housing 12, the seal 28 remaining on the tubular housing 12, the cap 26 and the mechanical filter 30 may be cleaned independently from the tubular housing 12. Solvents may be used for cleaning the cap 26 and the mechanical filter 30.

Figure 8:
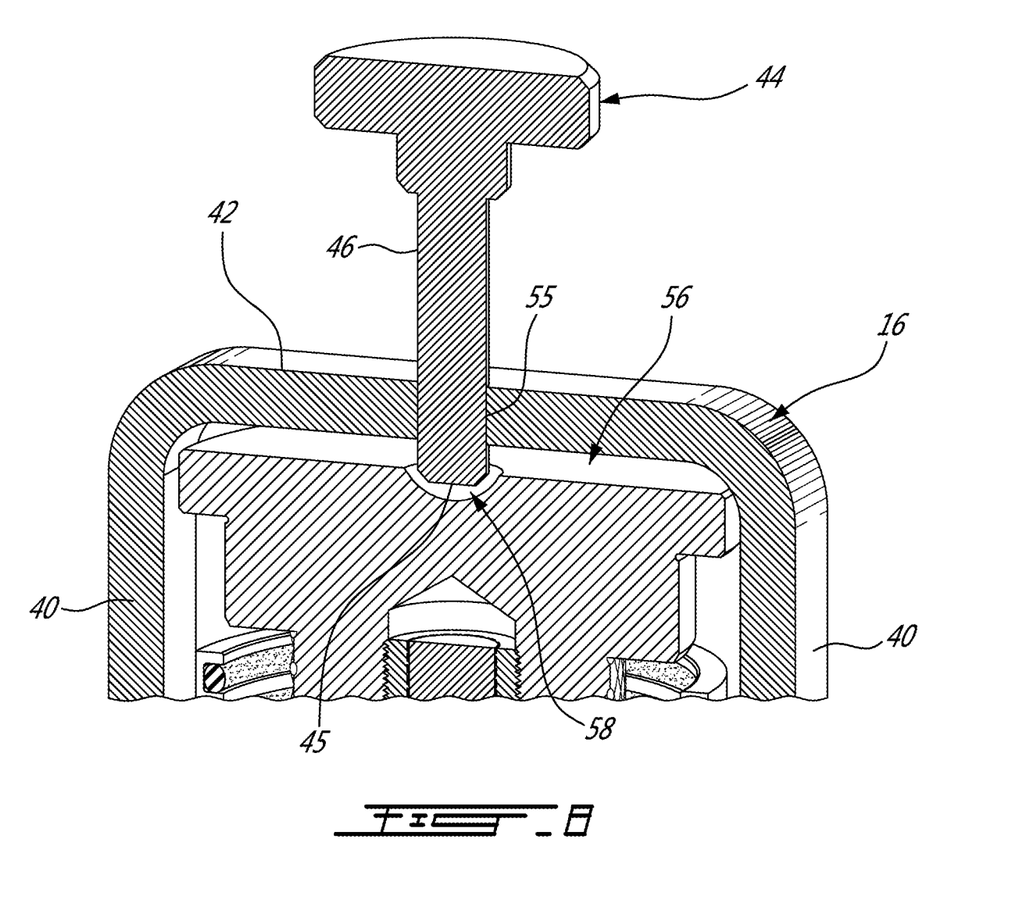
FIG. 8 is a top cross-sectional view of a filter assembly according to an embodiment of an aspect of the present disclosure.

As shown in FIG. 8, the end tip 45 of the rod 46 of the fastener 44 may be received within a receiving seat 58 provided on the upper surface of the cap 26, for further alignment of the rod 46. As the rod 46 passes through the aperture 55 of the linking arm 42 of the mounting arm 16, upon reaching the outer surface 56 of the cap 26, the end tip 45 engages with the receiving seat 58 on the upper surface of the cap 26 for self-alignment of the rod 46 within the tubular housing 12 over the cap 26. Such self-alignment resists vibrations of the filter, preventing loosening of the cap 26 from the open top of the housing 12 and thus spilling of the filter assembly 10.

As people in the art will now be in a position to appreciate, the mounting arm and fastener are configured to precisely and sealingly maintain the cap 26 to the tubular housing 12, by applying uniform pressure, in secured alignment, on the cap 26.

To remove the filtering unit 14 from the tubular housing 12, the mounting arm 16 is detached from the tubular housing 12. Then, the user operates the fastener 44, by turning it counter-clockwise for example in the case of a threaded rod 46 for example, so as to disengage the rod 46 from the top outer surface 56 of the cap 26, which then allows withdrawing the cap 26 and the mechanical filter 30 from within the tubular housing 12. The filtering unit 14 may then be cleaned and reused.

Figure 6:
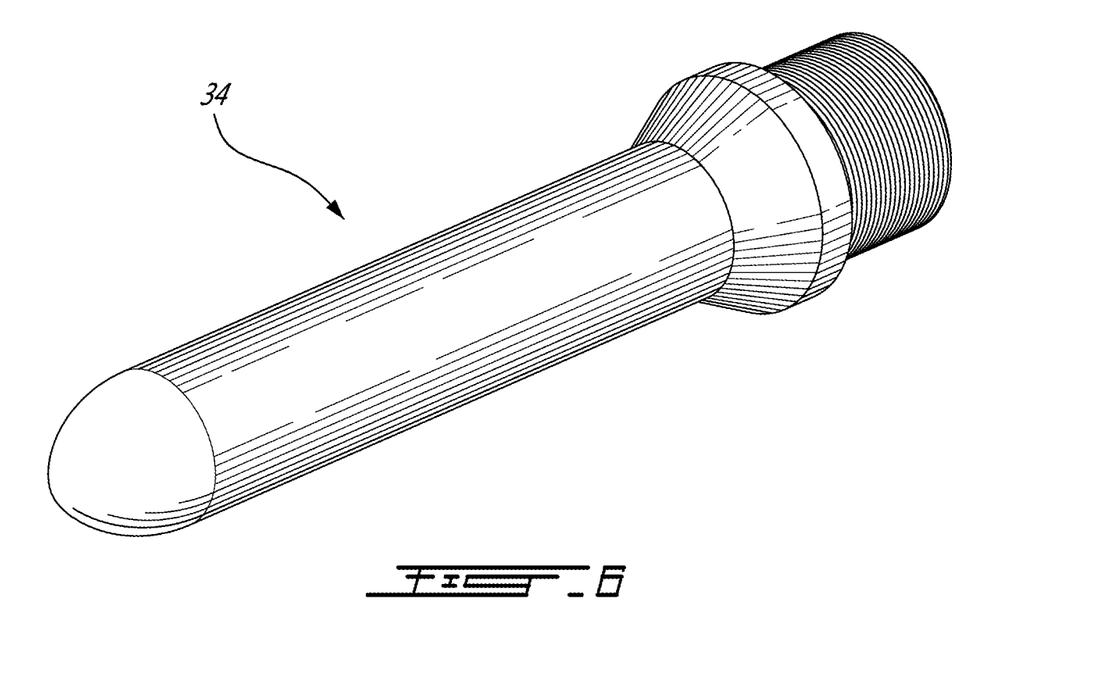
FIG. 6 is a perspective view of a magnet of a filter assembly according to an embodiment of an aspect of the present disclosure.

The filtering unit 14 may comprise a magnet 34, extending from an inside surface of the cap 26, and extending from within the tubular housing 12 when the filtering unit 14 is positioned within the tubular housing 12 (see FIGS. 1B and 9 for example). In such case, fluid entering the tubular housing 12 via the inlet 24 flows over the magnet 34 and passes through the cylindrical screen 30 before flowing out of the tubular housing 12 through the outlet 22 magnetically and mechanically filtered. The magnet 34 shown in FIG. 6, in stainless steel, may be screwed the inside surface of the cap 26, and unscrewed from the inside surface of the cap 26 using a coin or with a key wrench for example.

Each element of the filter assembly 10 may be selectively made of non-corrosive and washable material. Wetted elements may be made in stainless steel. The filter assembly 10 is thus resistant to water-based inks, which typically contain amines, and solvent base ink.

The scope of the claims should not be limited by the embodiments set forth in the examples, but should be given the broadest interpretation consistent with the description as a whole.

The invention claimed is:

1. A filter assembly, comprising:
an open top housing comprising an inlet and an outlet;
a filtering unit configured to be positioned within said housing, said filtering unit comprising a filter;
a mounting arm connected to said housing; and
a fastener, said fastener being actuatable for extension from said mounting arm;
wherein:
i) in a first position, the mounting arm is moved away from the open top of the housing;
ii) in a second position, said filtering unit is positioned within the housing, the mounting arm is positioned on top of the housing, and said mounting arm secures the filter within the housing;
iii) in a third position, said filter is being positioned within the housing, the mounting arm is positioned on top of the housing and connected to said housing in fluid tightness, said mounting arm secures the filter in fluid tightness within the housing; and the inlet and the outlet of the housing are opened to a flow of fluid to be filtered through the filter; and
wherein said mounting arm comprises side arms connected together by a linking arm and pivotally connected to the housing; said fastener comprises a rod extending from a knob and mounted through an aperture of the linking arm; said filter is a screen extending from a cap, said screen having a length from said cap selected so that a bottom edge of the screen seats on a receiving seat on an inner surface of the housing opposite the open top of the housing the receiving seat ensuring alignment of the screen within the housing when the filter is positioned within the housing, said inner surface of the housing comprising a seat receiving the bottom edge of the screen when the filter unit is positioned within the housing.

2. The filter assembly of claim 1, wherein a seal is mounted on an inner wall of the housing, said seal being positioned between said cap and the inner wall of the housing in said second and third positions of the filter assembly.

3. The filter assembly of claim 1, wherein, in said first position, said filter is removed out of said housing from said third position by actuation of said fastener.

4. The filter assembly of claim 1, wherein, said screen extends from said cap at a first edge of said screen, said mounting arm comprises an aperture, said fastener comprises a rod and an actuator controlling extension of said rod through said aperture of the mounting arm; wherein, from said first position, said aperture of the mounting arm is positioned on top of the housing by moving the mounting arm on top of the housing, and said actuator operates extension of the rod through the aperture of the mounting arm.

5. The filter assembly of claim 1, wherein, from said cap at a first edge of said screen, said mounting arm comprises an aperture, said fastener comprises a rod and an actuator controlling extension of said rod through said aperture of the mounting arm; wherein, from said first position, said aperture of the mounting arm is positioned on top of the housing by moving the mounting arm on top of the housing, and said actuator operates extension of the rod through the aperture of the mounting arm down to a top surface of the cap and said actuator controls pressure submitted by the rod when the rod abuts on the cap.

6. The filter assembly of claim 1, wherein a seal is mounted on an inner lateral wall of the housing, said seal being positioned between the filtering unit within the housing and said an inner lateral wall of the housing when the filtering unit is positioned within the housing; and wherein, once said filtering unit is removed from within said housing, said seal remains on the housing.

7. The filter assembly of claim 1, wherein said screen is mounted by a top edge thereof to the cap of said filtering unit, the length of said screen between the bottom edge and the top edge being selected so that the bottom edge abuts the receiving seat on the inner surface of the housing opposite the open top of the housing in said third position.

8. The filter assembly of claim 1, wherein said rod is configured to extend from said knob in and out through an aperture of said mounting arm.

9. The filter assembly of claim 1, said mounting arm comprising an aperture; wherein in the first position, the mounting arm is pivoted away from the top of the housing, allowing positioning of the filter within the housing; then the filtering unit is positioned so that the bottom edge thereof abuts the receiving seat ensuring alignment of the screen within the housing; the mounting arm is pivoted on top of the housing, then the knob actuates the rod through the aperture of the mounting arm down to said cap of the filtering assembly until alignment of the filter within the housing; and the mounting arm is secured to the housing in fluid tightness once the filter is aligned within the housing.

10. The filter assembly of claim 1, wherein said mounting arm comprising an aperture, and wherein, from said first position, the mounting arm is pivoted on top of the housing and the knob pushes the rod through the aperture of the mounting arm down to a top surface of said cap of the filtering assembly until said seat of the cap receives a free end tip of said rod; and the mounting arm is further secured to the housing in fluid tightness with the filtering assembly within the housing once the filter is thus aligned within the housing.

11. The filter assembly of claim 1, said fastener being configured to apply a pressure on said cap to precisely and sealingly align said filter within the housing.

12. The filter assembly of claim 1, wherein said filter comprises a mechanical filter.

13. The filter assembly of claim 1, wherein said filter comprises a magnetic filter.

14. A sealing combination for a filter assembly comprising a filter within a housing, said combination comprising a mounting arm and a fastener actuatable for extension from said mounting arm wherein the mounting arm is moved away from an open top of the housing in a first position; and in said first position, said filter is positioned so that a bottom edge thereof abuts a receiving seat on a bottom inner surface of the housing within the housing; once the filter is positioned in alignment by said receiving seat within the housing, the mounting arm is positioned over the open top of the housing and connected to said housing in fluid tightness, wherein said mounting arm comprises side arms connected together by a linking arm and pivotally connected to the housing; said fastener comprises a rod extending from a knob and mounted through an aperture of the linking arm; said filter is a screen extending from a cap, said screen having a length from said cap selected so that a bottom edge of the screen seats on an inner surface of the housing opposite the open top of the housing when the filter is positioned within the housing, said inner surface of the housing comprising a seat receiving the bottom edge of the screen when the filter unit is positioned within the housing.

15. The filter assembly of claim 1, wherein said receiving seat is a circumferential recess on the inner surface of the housing opposite the open top of the housing, ensuring alignment of the screen within the housing.

16. The filter assembly of claim 1, wherein said receiving seat is a circumferential recess of one of: a conical shape and an ellipsoidal shape, on the inner surface of the housing opposite the open top of the housing, ensuring alignment of the screen within the housing.

17. The sealing combination of claim 14, wherein said receiving seat is a circumferential recess on the bottom inner surface of the housing, ensuring alignment of the screen within the housing.

18. The sealing combination of claim 14, wherein said receiving seat is a circumferential recess of one of: a conical shape and an ellipsoidal shape, on the bottom inner surface of the housing, ensuring alignment of the screen within the housing.

* * * * *